Nov. 4, 1924.                                                    1,513,964
                              F. S. CARR
                          SEPARABLE FASTENER
                       Original Filed Dec. 2, 1921
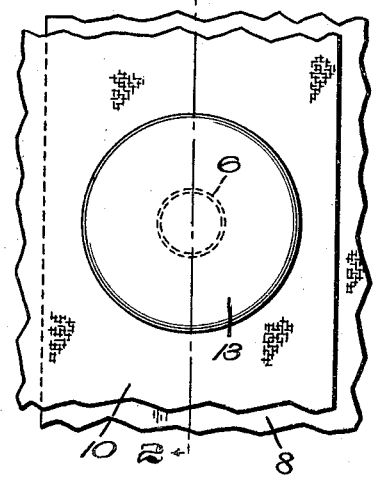
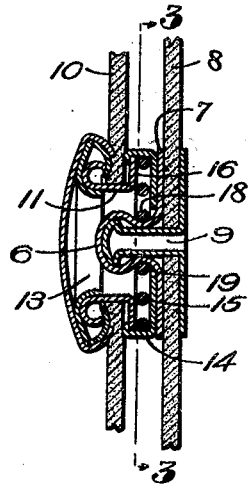
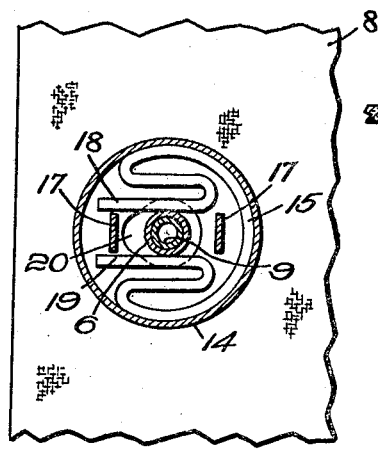
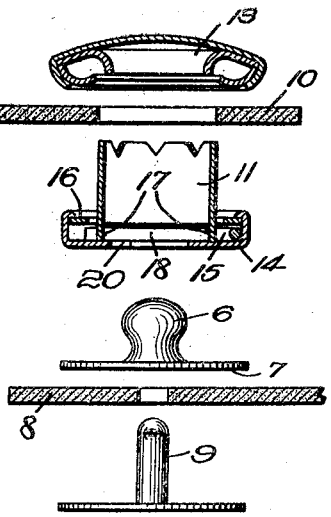
Inventor:
Fred S. Carr,
by Emery Booth Janney Varney
                Attys.

Patented Nov. 4, 1924.

1,513,964

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

SEPARABLE FASTENER.

Application filed December 2, 1921, Serial No. 519,385. Renewed April 28, 1924.

*To all whom it may concern:*

Be it known that I, FRED S. CARR, a citizen of the United States, and a resident of Newton, in the county of Middlesex and State of Massachusetts, have invented an Improvement in Separable Fasteners, of which the following description, in connection with the accompanying drawings, is a specification, like characters on the drawings representing like parts.

This invention relates to improvements in separable fasteners and more particularly, though not exclusively, to improvements in separable fasteners of that type wherein the parts are so organized as to be locked against separation by that tipping movement which normally arises from the resolution of forces produced by a lateral strain between stud and socket.

In the drawings, which show a preferred embodiment of one form of my invention particularly adapted for glove fasteners and the like:—

Figure 1 is a front elevation of the preferred form of fastener;

Fig. 2 is a section on the line 2—2 of Fig. 1;

Fig. 3 is a section on the line 3—3 of Fig. 2; and

Fig. 4 is a diagrammatic view showing the parts of the fastener prior to assembly.

Referring to the drawings and to the preferred form of my invention selected for illustrative purposes, I have shown a stud including a head 6 and a base 7 secured to the stud-carrying fabric 8 by the usual rivet 9 and cooperating with a socket secured to the socket-carrying fabric 10 by the tubular rivet portion 11 penetrating the socket-carrying fabric 10 and clenched within the usual socket-securing cap 13. It will be understood that while I have referred to stud and socket-carrying fabric, any suitable flexible carrying medium may be used.

The socket proper includes the casing 14 containing the spring 15 which, as illustrated, is preferably of the type presenting generally parallel resilient end portions for engagement with the stud and resilient reverse bends connecting these ends with an integral support adjacent the periphery of the socket casing, and the casing closure plate 16 which the marginal portions of the casing 14 overlie. The closure plate 16 and the front face of the casing 14 may be spaced apart by projections 17 thrown downwardly from the closure plate 16, which is preferably as illustrated integral with the rivet portion 11. These projections 17 also preferably serve as spacing and locating elements for the jaws 18, 19 of the spring 15. The face of the casing 14 is apertured to admit the stud between spring jaws 18 and 19, and this aperture is preferably, as illustrated, extended by a notch 20 in the direction toward the ends of the spring jaws 18 and 19 to provide a lateral lock against strains between stud and socket in the direction of the notch 20. In applying the socket to the glove or other object on which the socket is used, this notch should be positioned in the direction of strain, as toward the adjacent edge of the glove.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims.

1. A fastener comprising, in combination, a stud having a head and a neck, a socket including a casing having a stud-receiving aperture therethrough and a notch at one side of said aperture, and a casing closure plate having a projection thrown downwardly therefrom against the interior face of said casing, the marginal flange of said casing thrown inwardly to engage over said closure plate and a spring of the type presenting generally parallel resilient end portions for engagement with the stud and resilient reverse bends connecting these ends with an integral support adjacent the periphery of the socket casing, said projection extending between the stud-engaging portions of said spring and locating said spring relative to said notch.

2. A fastener comprising, in combination, a stud having a head and a neck, a socket including a casing having a stud-receiving aperture therethrough, and a casing closure plate having a projection thrown downwardly therefrom against the interior face of said casing, the marginal flange of said casing thrown inwardly to engage over said closure plate and a spring of the type presenting generally parallel resilient end portions for engagement with the stud and resilient reverse bends connecting these ends with an integral support adjacent the periphery of the socket casing, said projections extending between the stud-engaging portions of said spring.

3. A fastener comprising, in combination, a stud having a head and a neck, a socket including a casing having a stud-receiving aperture therethrough, a casing closure plate having a projection thrown downwardly therefrom against the interior face of said casing, the marginal flange of said casing thrown inwardly to engage over said closure plate and a spring of the type presenting generally parallel resilient end portions for engagement with the stud and resilient reverse bends connecting these ends with an integral support adjacent the periphery of the socket casing, said projection extending between the stud-engaging portions of said spring, and a tubular rivet thrown upwardly from said casing closure plate, said tubular rivet of considerably larger diameter than said stud-receiving aperture, thereby to prevent interference of said closure plate with said head of said stud.

4. A fastener comprising, in combination, a stud having a head and a neck, a socket including a casing having a stud-receiving aperture and a notch at one side of said aperture, a casing closure plate presenting means for cooperation with a socket-attaching cap, a spring of the type presenting generally parallel resilient end portions for engagement with the stud and resilient reverse ends connecting these ends with an integral support adjacent the periphery of the socket casing, and means for locating the stud-engaging portions of said spring relative to said notch.

5. A fastener comprising, in combination, a stud having a head and a neck, a socket including a casing having a stud-receiving aperture and a notch at one side of said aperture, a casing closure plate fitting within said casing and presenting attaching means for cooperation with a socket-securing cap, a spring presenting resilient jaws for engaging opposite sides of said stud, and a plurality of struts spacing said closure plate relative to said casing and contributing to location of said jaws relative to said notch.

In testimony whereof, I have signed my name to this specification.

FRED S. CARR.